United States Patent
Reisacher

[11] 3,709,200
[45] Jan. 9, 1973

[54] COOLING WATER CONDUIT SYSTEM IN INTERNAL COMBUSTION ENGINES

[75] Inventor: Josef Reisacher, Fellbach (Wurtt.), Germany

[73] Assignee: Daimler-Benz Aktiengesellschaft, Stuttgart-Unterturkheim, Germany

[22] Filed: April 25, 1969

[21] Appl. No.: 819,262

[30] Foreign Application Priority Data

April 27, 1968 Germany..................P 17 51 261.7

[52] U.S. Cl.........123/41.82, 123/41.29, 123/55 VE
[51] Int. Cl...........................F02f 11/38, F02b 75/20
[58] Field of Search.123/41.29, 41.28, 41.25, 122 A, 123/52 MV, 56 AC, 56 AB, 56 AA, 56 A, 41.82, 55

[56] References Cited

UNITED STATES PATENTS

| 1,179,054 | 4/1916 | Twombly | 123/56 AC |
| 2,845,051 | 6/1954 | Leach | 123/41.29 |
| 2,941,521 | 7/1958 | Rarey et al. | 123/122 A |
| 2,949,103 | 9/1959 | Carlton | 123/122 A |

FOREIGN PATENTS OR APPLICATIONS

| 434,409 | 4/1948 | Italy | 123/55 V X |

OTHER PUBLICATIONS

Gill, Smith, and Ziurys, Fundamentals of Internal Combustion Engines, 1959, Chapter 1, pp. 1-3 and 1-4.

Primary Examiner—Laurence M. Goodridge
Assistant Examiner—Cort Flint
Attorney—Craig, Antonelli and Hill

[57] ABSTRACT

A cooling water conduit system for an internal combustion engine especially for V-type engines in which several cylinder heads are provided for each cylinder row, that contain cooling water discharge apertures at the bottom surface; the cooling water discharge apertures are connected with common collecting lines by way of channels accommodated in the crankcase of the engine.

9 Claims, 3 Drawing Figures

COOLING WATER CONDUIT SYSTEM IN INTERNAL COMBUSTION ENGINES

The present invention relates to a cooling water conduit system in reciprocating piston or lifting cylinder internal combustion engines with horizontal or inclined cylinder rows, especially in V-engines, with several cylinder heads whose outlet or discharge openings for the cooling water are connected to a common collecting line arranged outside of the cylinder heads.

Beginning with a predetermined number of cylinders, it is no longer appropriate with series engines for weight reasons to provide a common cylinder head for a given cylinder row. Consequently, several cylinder heads for the cylinders are provided. With these reciprocating-piston-type or lifting-cylinder-type internal combustion engines, common, collecting lines for the cooling water are provided which are connected to the individual cylinder heads and which conduct the cooling water to the radiator. The discharge apertures of the cylinder heads for the cooling water are, for the most part, located laterally or at the top in the cylinder heads where is then also located the common, collecting line. These common, collecting lines require space to a considerable extent and thus impair the accommodation of the intake and exhaust lines also arranged within this area. Since the common, collecting lines have to be extended with a slight rise to the receiving tank of the radiator, the radiator frequently has to be arranged therefore so high that it is no longer possible to mount the fan directly on the crankshaft. Consequently, costly intermediate connecting drives for the fan are necessary.

The present invention aims at avoiding these disadvantages and at reducing the over-all structure of reciprocating-piston or lifting-cylinder internal combustion engines of the aforementioned type and as a result thereof at enabling a better space utilization. Additionally, the over-all construction is to be simplified by the present invention. The present invention essentially consists in that the common collecting line is secured at the cylinder block and the discharge apertures arranged on the bottom side of the cylinder heads are connected with the common line by way of channels accommodated in the cylinder block and passing through the cylinder head seals. As a result thereof, the common line can be located so low that the structural height of the engine is not influenced and that with certainty is achieved the arrangement of the fan of the radiator on the crankshaft. In particular with V-type engines, this arrangement of the cooling water common line is extraordinarily advantageous because the space disposed between the V can now be utilized, in addition for its use for the intake and exhaust lines or manifolds, also for the arrangement of further installations, for example, for the accommodation of the injection pump with its control device.

In order to avoid that vapor bubbles form in the cooling circulatory system, it is appropriate if the cylinder heads are so constructed that the highest point of the cooling water spaces of each cylinder head is disposed approximately at the height of the discharge apertures. The common line can then be screwed on to the cylinder block in a structurally simple manner by the interposition of seals.

In an extraordinarily advantageous type of construction of the present invention, the common collecting line may be cast-on at the cylinder block to be integral therewith. In addition to the advantage that no further sealing elements other than the already present cylinder head seal and also no securing elements have to be provided, the additional considerable advantage results therefrom that the cylinder block wall is reinforced by the cast-on, common line.

Accordingly, it is an object of the present invention to provide a cooling water conduit system for reciprocating internal combustion engines which avoids by simple means the aforementioned shortcomings and drawbacks encountered in the prior art.

Another object of the present invention resides in a cooling water conduit system for reciprocating piston-type internal combustion engines which excels by a very favorable space utilization, particularly in case of V-type engines while assuring a simple drive for the radiator fan directly from the crankshaft.

Still a further object of the present invention resides in a cooling water conduit system for internal combustion engines of the aforementioned type which permits a reduction of the over-all construction of the engine together with a reduction in the parts necessary for the various connections.

These and other objects, features, and advantages of the present invention will become more obvious from the following description when taken in connection with the accompanying drawing, which shows, for purposes of illustration only, two embodiments in accordance with the present invention, and wherein:

FIG. 3 is a schematic plan view of an engine similar to that of FIGS. 1 or 2 showing the cylinder heads arranged one behind the other in rows.

Figure 1:
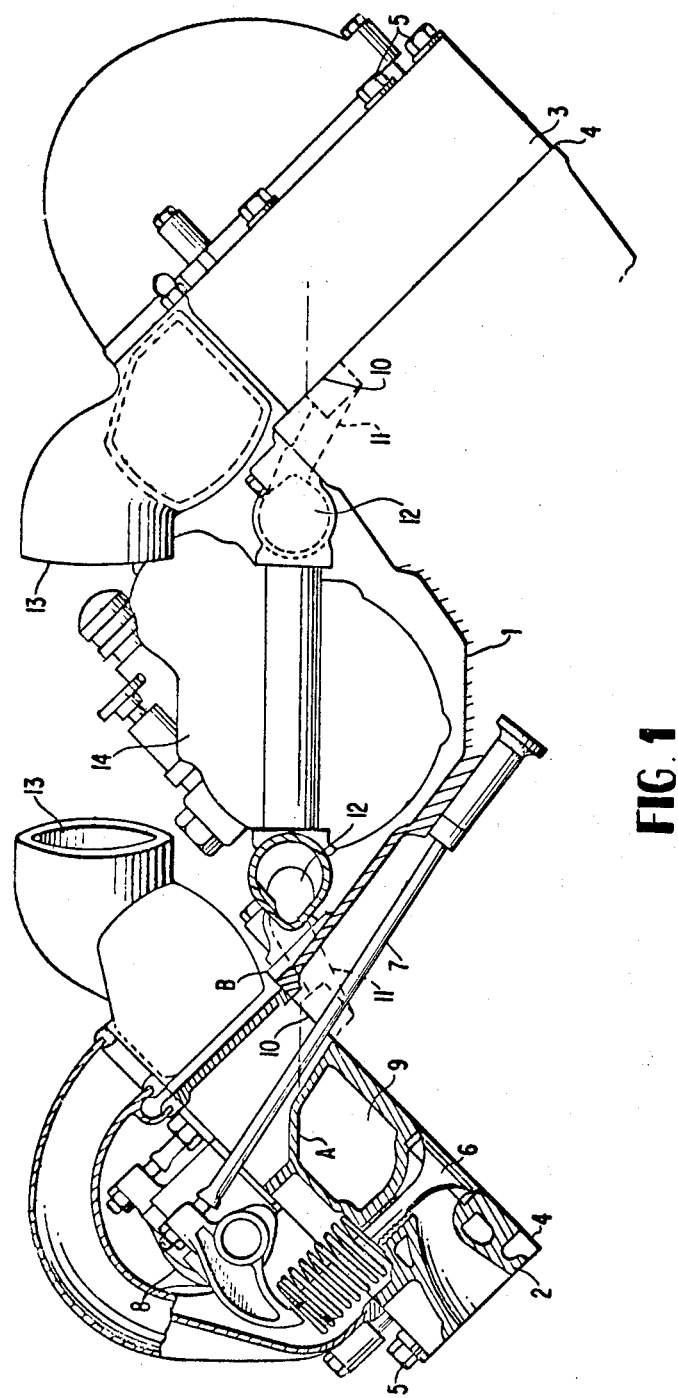
FIG. 1 is a partial end elevational view, partly in cross section, of a reciprocating piston-type internal combustion engine according to the present invention with a V-arrangement of the cylinder rows.

Referring now to the drawing and more particularly to FIG. 1, two cylinder rows are arranged V-shaped with respect to the cylinder block (not shown) inside of the crankcase 1 of the illustrated reciprocating piston internal combustion engine. Several cylinder heads 2 and 3 are provided for each of the cylinder rows which are secured at the cylinder block 1 under interposition of cylinder head seals 4 by means of bolts 5. These cylinder heads 2 and 3 close off the combustion spaces in the upward direction and contain the inlet and outlet valves 6 which are conventionally actuated from a cam shaft (not shown) by way of rocker arms 8 actuated by push rods 7.

The cylinder heads 2 and 3 are so constructed that the highest point A of the cooling water spaces 9 thereof are not located above the upper edge B of the cylinder block 1. It is possible thereby to provide the discharge apertures 10 for the cooling water on the bottom side of the cylinder heads 2 and 3 and to connect the same with a common line 12 secured at the cylinder block 1 by way of channels 11 worked into the cylinder block 1. The common lines 12 are threadably secured at the cylinder block 1 by the conventional threaded members T and by the interposition of conventional seals. As a result thereof, the structural height of the engine is lowered because the suction lines 13 can be located lower. Additionally, the space between the V can be better utilized in that the injection pump 14 with regulator or control device of conventional construction is arranged in such space. Furthermore, the advantage results that with an exchange of a cylinder head 2 or 3, the common line 12 does not have to be removed or disassembled.

Figure 2:
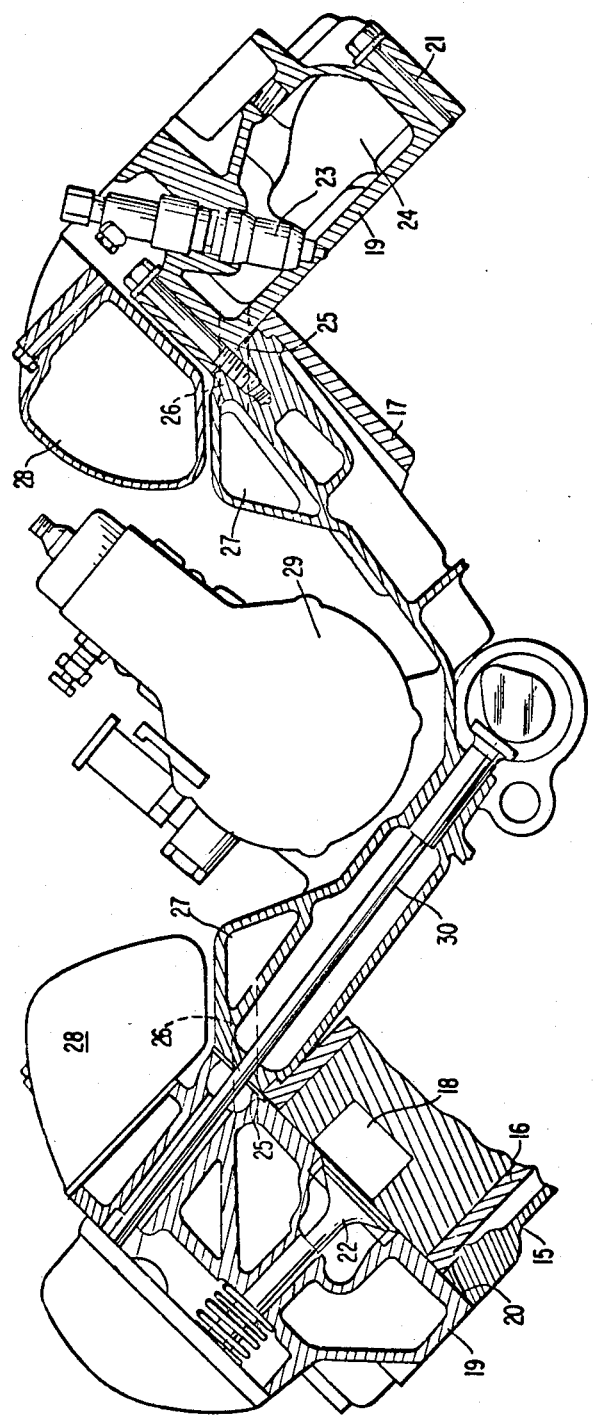
FIG. 2 is a partial end elevational view, similar to FIG. 1, of a modified embodiment of a reciprocating piston-type internal combustion engine in accordance with the present invention.

A particularly advantageous type of construction of the present invention is illustrated in FIG. 2. Also with this reciprocating-piston internal combustion engine, the cylinders 16 and 17 are arranged V-shaped with respect to the cylinder block in the crankcase 15. The combustion spaces 18 are also closed off by individual cylinder heads 19 which are secured on the cylinder block 15 by means of bolts 21 under interposition of conventional cylinder head seals 20. The cylinder heads 19 contain conventional control devices such as inlet and outlet valves 22 with associated valve-actuating means as well as the injection nozzle 23. The cylinder heads 19 are so constructed that the highest point of the cooling water spaces 24 is disposed below the upper edge of the cylinder block 15.

The discharge apertures 25 for the cooling water out of the cylinder heads 19 are accommodated on the bottom side of the cylinder heads 19 and are in communication with the common or collecting lines 27 cast integral with the cylinder block 15 by way of channels 26 provided in the cylinder block 15. As a result of the cast-on common, collecting line 27 which is of triangular shape in cross section, the additional securing means and seals for the common lines 27 can be dispensed with in the embodiment of FIG. 2 as compared to the embodiment of FIG. 1.

In addition to the extraordinarily advantageous space subdivision which enables a favorable accommodation of the air intake lines 28 and of the injection pump 29 with its regulator and which further enables that the fan of the radiator can be arranged directly on the crankshaft without any intermediate connection of belt drives or the like, the further advantage is achieved by the present invention that as a result of the cast-on collecting lines 27, a reinforcement of the lateral walls of the cylinder block 15 is achieved. This reinforcement of the lateral walls together with the cooling water filling of the common lines 27, brings about that the noises produced as a result of the oscillations and vibrations of the push rods 30 can be radiated to a considerably lesser extent so that a considerable noise reduction is achieved.

While I have shown and described only two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A cooling water conduit system for reciprocating-piston internal combustion engines having several rows of cylinders, several cylinder head means arranged one behind the other in rows whose discharge aperture means for the cooling water are connected to common line means arranged outside of the cylinder head means, and seal means located between the cylinder block and the cylinder head means, and the discharge aperture means are arranged at the bottom side of the cylinder head means and are connected with the common line means by channel means provided in the cylinder block and extending through the cylinder head seal means.

2. A cooling water conduit system according to claim 1, characterized in that the engine is provided with inclined cylinder rows accommodating therein reciprocating pistons.

3. A cooling water conduit system according to claim 2, characterized in that the engine is a V-type engine.

4. A cooling water conduit system according to claim 1, characterized in that the cylinder head means are so constructed that the highest point of the cooling water spaces of each cylinder head means is located approximately at the height of the discharge aperture means.

5. A cooling water conduit system according to claim 4, characterized in that each common line means is threadably secured at the cylinder block by the interposition of seal means.

6. A cooling water conduit system according to claim 4, characterized in that a respective common line means is cast-on at the cylinder block integrally therewith.

7. A cooling water conduit system according to claim 4, characterized in that the engine is a V-type engine.

8. A cooling water conduit system according to claim 1, characterized in that each common line means is threadably secured at the cylinder block by the interposition of seal means.

9. A cooling water conduit system according to claim 1, characterized in that a respective common line means is cast-on at the cylinder block integrally therewith.

* * * * *